United States Patent
Kohno

(10) Patent No.: US 10,259,031 B2
(45) Date of Patent: Apr. 16, 2019

(54) DIE CUSHION DEVICE OF PRESS MACHINE

(71) Applicant: AIDA ENGINEERING, LTD., Kanagawa (JP)

(72) Inventor: Yasuyuki Kohno, Kanagawa (JP)

(73) Assignee: Aida Engineering, Ltd., Kanagawa (JP)

(*) Notice: Subject to any disclaimer, the term of this patent is extended or adjusted under 35 U.S.C. 154(b) by 367 days.

(21) Appl. No.: 15/158,049

(22) Filed: May 18, 2016

(65) Prior Publication Data

US 2016/0354828 A1 Dec. 8, 2016

(30) Foreign Application Priority Data

Jun. 3, 2015 (JP) ................................. 2015-113022

(51) Int. Cl.

| B21D 24/14 | (2006.01) |
|---|---|
| B21D 24/02 | (2006.01) |
| B21D 24/10 | (2006.01) |
| F16F 15/027 | (2006.01) |
| B30B 15/02 | (2006.01) |

(52) U.S. Cl.
CPC ............. *B21D 24/14* (2013.01); *B21D 24/02* (2013.01); *B21D 24/10* (2013.01); *B30B 15/026* (2013.01); *F16F 15/0275* (2013.01)

(58) Field of Classification Search
CPC ......... B21D 24/10; B21D 24/14; B21D 24/02
See application file for complete search history.

(56) References Cited

U.S. PATENT DOCUMENTS

| 5,435,166 A | 7/1995 | Sunada |
|---|---|---|
| 5,687,598 A * | 11/1997 | Kirii ...................... B21D 24/14 |
| | | 72/21.5 |
| 2006/0010954 A1 | 1/2006 | Baba et al. |
| 2008/0127838 A1 | 6/2008 | Baba et al. |

(Continued)

FOREIGN PATENT DOCUMENTS

| CN | 103963335 A | 8/2014 |
|---|---|---|
| EP | 2 789 408 A1 | 10/2014 |
| JP | 06-000543 A | 1/1994 |

(Continued)

OTHER PUBLICATIONS

Extended European Search Report issued in corresponding EP Application No. 16169650.5, dated Oct. 25, 2016.

(Continued)

*Primary Examiner* — Teresa M Ekiert
(74) *Attorney, Agent, or Firm* — McDermott Will & Emery LLP

(57) ABSTRACT

A die cushion device of a press machine includes: a plurality of cushion pads; a plurality of die cushion force generators that supports the plurality of respective cushion pads, and that is capable of independently moving up and down the plurality of respective cushion pads as well as independently generating die cushion force for each of the cushion pads; and a die cushion controller that controls the plurality of die cushion force generators to independently move up and down the plurality of respective cushion pads as well as to independently generate die cushion force for each of the cushion pads.

6 Claims, 9 Drawing Sheets

(56) References Cited

U.S. PATENT DOCUMENTS

2014/0202223 A1    7/2014   Kohno et al.

FOREIGN PATENT DOCUMENTS

| JP | 07-100552 A | 4/1995 |
|----|-------------|--------|
| JP | 2006-051541 A | 2/2006 |
| JP | 2006-192481 A | 7/2006 |
| JP | 2008-114231 | 5/2008 |

OTHER PUBLICATIONS

Office Action issued in corresponding Japanese Patent Application No. 2015-113022, dated Aug. 4, 2016 (w/partial English translation).

First Office Action issued in Chinese Patent Application No. 201610387555.5, dated Jan. 29, 2019 (English Translation).

* cited by examiner

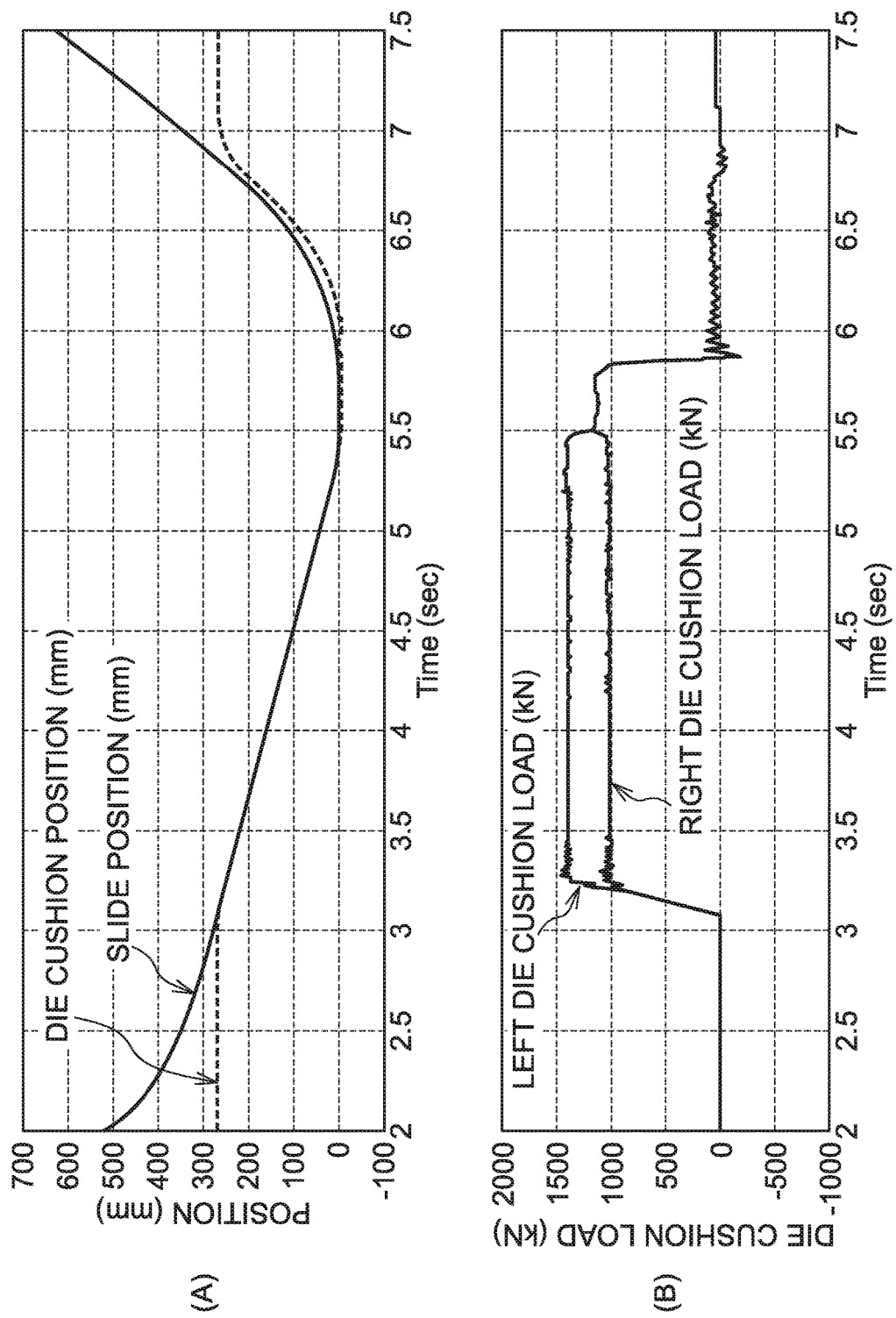

DIE CUSHION DEVICE OF PRESS MACHINE

This application claims priority to Japanese Patent Application No. 2015-113022, filed on Jun. 3, 2015, the disclosures of each of which are hereby incorporated by reference.

BACKGROUND OF THE INVENTION

Field of the Invention

The present invention relates to a die cushion device of a press machine, and more particularly to a die cushion device of a press machine, with a plurality of cushion pads for one press machine.

Description of the Related Art

Heretofore, this kind of die cushion device has been disclosed in Japanese Patent Application Laid-Open No. 06-000543 (Patent Literature 1), Japanese Patent Application Laid-Open No. 07-100552 (Patent Literature 2), and Japanese Patent Application Laid-Open No. 2006-192481 (Patent Literature 3).

Patent Literature 1 describes a die cushion device that includes a plurality of divided cushion pads each of which supports a lower die from below through a cushion pin. Each of pad members is connected to a rack rod that is connected to a servo motor provided in each the pad members through a reduction gear train. A numeric value control device provides position control and torque control to each of servo motors to obtain cushioning action.

In an embodiment of the invention described in Patent Literature 1, four divided cushion pads are used, and driving force can be transmitted to the pads by respective four pairs of rack-and-pinion mechanisms, each of which is driven by a servo motor. Two pairs of the rack-and-pinion mechanisms of the four pairs of rack-and-pinion mechanisms are positioned in a side-to-side direction, and a joint with a minimum backlash connects between shafts of the respective pinions. Two pairs of the rack-and-pinion mechanisms of the four pairs of rack-and-pinion mechanisms are also positioned in a vertical direction, and intermediate gears in a reduction gear train are engaged with each other with a minimum backlash (refer to the paragraph [0007] in Patent Literature 1). That is, Patent Literature 1 shows that the four pairs of rack-and-pinion mechanisms are mechanically synchronized with each other with minimum backlashes.

Patent Literature 2 describes the invention that provides a die cushion device of a press, in which a pad body is elastically supported by a cushion cylinder, and an NC cushion cylinder to which numerical control is provided controls cushion force. The pad body is divided into a plurality of pad members, and a part of the pad members is coupled with each other by a coupler to form a flexible structure. In addition, one cushion cylinder and one NC cushion cylinder are provided for each of the pad members.

Patent Literature 3 describes a die cushion device that includes a plurality of small pads that receives pressing force of a slide through a cushion pin, a large pad that supports the plurality of small pads, and an urging force generating device that moves up and down the large pad while generating upward urging force against the pressing force.

SUMMARY OF THE INVENTION

Patent Literature 1 describes not only a basic feature of a servo die cushion device that can provide arbitrary cushioning action, but also features of enabling downsizing and a low price of the entire device as compared with a conventional device that provides cushioning action by using an air cylinder and a hydraulic cylinder, and of enabling a work tending to easily wrinkle or crack, such as aluminum, to be prevented from wrinkling or cracking by cushioning action independently controlled by a servo motor for each pad while there is no description of reason.

Although there is no clear description of a relationship between the features described above and a reason for dividing the cushion pad, it is deemed that dividing the cushion pad may uniformly apply predetermined die cushion force (to be applied) to material even if a press machine (such as bolster) deforms.

Unfortunately, although the die cushion device described in Patent Literature 1 uses rack-and-pinion mechanisms that drive the respective pad members, the plurality of rack-and-pinion mechanisms is mechanically synchronized with each other with a joint and an engaged gear train. As a result, it is impossible to allow the die cushion device to serve as a plurality of die cushion devices capable of setting a die cushion stroke and die cushion force, different for each of the pad members, even if the die cushion device is controlled by making any originality and ingenuity.

In addition, a plurality of drive shafts of the rack-and-pinion mechanisms, driving the respective pad members, has a "play" of a backlash of the gear train at most, and thus it is impossible to apply predetermined die cushion force to material with (greatly) different plate thickness for each portion on a surface of the cushion pad, such as tailored blank material, or to a blank holder (to which shim adjustment is applied) inclined in a side-to-side direction or a fore-and-aft direction, without causing mechanical strain.

It is also impossible to accurately apply die cushion force that is different for each of a plurality of pads because force interferes between respective shafts.

The die cushion device described in Patent Literature 2 has a feature as follows: the pad members are formed by dividing the pad body without using a cushion pad in integral structure with high rigidity; numerical control is applied to the NC cushion cylinder provided for each of the pad members; and a lower portion of a divided surface of each of the divided pad members is coupled by the coupler. Accordingly, increase in inclination, as well as variation of die cushion force, for each of the divided pad members, is prevented.

Unfortunately, the die cushion device described in Patent Literature 2, as with the die cushion device described in Patent Literature 1, cannot serve as a plurality of die cushion devices capable of setting a different die cushion stroke and different die cushion force, for each of the pad members.

Since the lower portion of the divided surface of each of the divided pad members is coupled by the coupling member, it is impossible to independently move each of the pad members greatly in a vertical direction, and also it is impossible to apply predetermined die cushion force to material with different plate thickness for each portion on the surface of the cushion pad, such as tailored blank material, or a blank holder inclined in the side-to-side direction or the fore-and-aft direction due to shim adjustment based on formability, without causing mechanical strain. In addition, it is impossible to accurately apply different die cushion force for each of a plurality of pad members.

If a cushion pad is divided into a plurality of pad members, overturning moment that is different in level for each of the pad members occurs between a point of application of the pad member and a reaction force point at the center of the pad member during drawing. As a result, each of the pad members bends, and thus cannot be smoothly lowered to allow press forming to be performed with limited accuracy. To solve this problem, the die cushion device described in Patent Literature 3 includes the cushion pad that is divided into the plurality of small pads to allow the cushion pad to smoothly lower, the large pad that supports the plurality of small pads so that die cushion force is uniformly applied to each of the small pads, and the urging force generating device that moves up and down the large pad. Unfortunately, since the plurality of small pads is coupled to the large pad, it is impossible to independently move each of the small pads, and also it is impossible to apply predetermined die cushion force to material with different plate thickness for each portion on the surface of the cushion pad, such as tailored blank material, or to the blank holder to which shim adjustment is applied, and which is inclined in the side-to-side direction or the fore-and-aft direction, without causing mechanical strain. In addition, it is impossible to apply different die cushion force for each of the plurality of pad members.

Technical features common to all of the die cushion devices described in Patent Literatures 1 to 3 are as follows: trying to apply uniform die cushion force to a cushion pad by dividing the cushion pad; and providing a mechanical synchronization mechanism for holding parallelism (synchronization) between divided pad members.

If a mechanical synchronization mechanism is used, synchronization action of die cushion force or a cushion pad position can be acquired within a rigidity range of the synchronization mechanism. However, synchronization action with higher accuracy (aggressive) than the synchronization action which has been acquired within the rigidity range of the synchronization mechanism cannot be acquired. In addition, each of the die cushion devices above cannot serve as a plurality of die cushion devices capable of setting a different die cushion stroke for each of the divided pads, and of setting die cushion force for each of the pads.

The present invention is made in light of the above-mentioned circumstances, and it is an object of the present invention to provide a die cushion device of a press machine that is capable of the following: improving a function of applying uniform die cushion force without depending on deformation centering a bolster of a press machine; synchronization with higher accuracy than accuracy of mechanical synchronization between a plurality of cushion pads; and serving as a plurality of die cushion devices capable of setting a die cushion stroke and die cushion force for each of the plurality of cushion pads.

To achieve the object described above, a die cushion device of a press machine in accordance with one aspect of the present invention includes: a plurality of cushion pads; a plurality of die cushion force generators that supports the plurality of respective cushion pads, and that is capable of independently moving up and down the plurality of respective cushion pads as well as independently generating die cushion force for each of the cushion pads; and a die cushion controller that controls the plurality of die cushion force generators to independently move up and down the plurality of respective cushion pads as well as to independently generate die cushion force for each of the cushion pads.

According to one aspect of the present invention, it is possible to accurately apply uniform die cushion force or desired die cushion force set for each of a plurality of cushion pads to the plurality of cushion pads without having mechanical restriction.

In another aspect of the present invention in accordance with die cushion device of a press machine, the plurality of cushion pads has a common die cushion stroke, and the die cushion controller includes one die cushion controller to control the plurality of respective cushion pads as one cushion pad.

According to another aspect of the present invention, it is possible to accurately apply uniform die cushion force or desired die cushion force set for each of a plurality of cushion pads to the plurality of cushion pads, as well as to control the plurality of cushion pads as virtually one cushion pad.

A die cushion device of a press machine in accordance with yet another aspect of the present invention includes a plurality of cushion pad position detectors that detects cushion pad positions of the plurality of respective cushion pads. In the die cushion device, the die cushion controller includes a die cushion position controller that includes a die cushion position commanding device that outputs a common die cushion position command, and a plurality of position control compensators that controls the plurality of respective die cushion force generators to independently move up and down each of the plurality of cushion pads, on the basis of the common die cushion position command outputted from the die cushion position commanding device, and cushion pad positions detected by the plurality of respective cushion pad position detectors.

According to yet another aspect of the present invention, it is possible to control positions of a plurality of cushion pads while the cushion pads are regarded as virtually one cushion pad.

In a die cushion device of a press machine in accordance with yet another aspect the present invention, it is preferable that two or more of the die cushion force generators are arranged for each of the plurality of cushion pads, and that the plurality of cushion pad position detectors corresponding to the plurality of respective die cushion force generators is provided to detect each of positions of two or more of the die cushion force generators, arranged for each of the plurality of cushion pads, or detect a die cushion position near each of the positions. It is also preferable that the plurality of position control compensators corresponding to the plurality of respective die cushion force generators is provided to control the plurality of respective die cushion force generators to independently move up and down each of the plurality of cushion pads, on the basis of the common die cushion position command outputted from the die cushion position commanding device, and a die cushion position detected by a corresponding cushion pad position detector in the plurality of cushion pad position detectors.

According to yet another aspect of the present invention, it is possible to control positions of a plurality of cushion pads while the cushion pads are regarded as virtually one cushion pad, and particularly it is possible to control a position of each of the cushion pads so that each of the cushion pads does not incline.

A die cushion device of a press machine in accordance with yet another aspect of the present invention includes a plurality of die cushion force detectors that detects corresponding die cushion force applied to the plurality of cushion pads from the plurality of respective die cushion force generators. In the die cushion device, the die cushion controller includes a die cushion force controller that includes a die cushion force commanding device that outputs a common die cushion force command or an individual die cushion force command corresponding to each of the plurality of cushion pads, to the plurality of die cushion force generators, and a die cushion force control compensator that controls each of the plurality of die cushion force generators to apply independent die cushion force to each of the plurality of cushion pads, on the basis of the common die cushion force command or the individual die cushion force command, outputted from the die cushion force commanding device, and die cushion force detected by each of the plurality of die cushion force detectors.

According to yet another aspect of the present invention, it is possible to accurately apply uniform die cushion force corresponding to a die cushion force command common to a plurality of cushion pad, or desired die cushion force corresponding to an individual die cushion force command.

In a die cushion device of a press machine in accordance with yet another aspect of the present invention, it is preferable that two or more of the die cushion force generators are arranged in each of the plurality of cushion pads, and that the plurality of die cushion force detectors corresponding to the plurality of respective die cushion force generators is provided to detect each die cushion force applied to the plurality of cushion pads from the plurality of respective die cushion force generators. It is also preferable that the plurality of die cushion force control compensators controls the plurality of respective die cushion force generators to apply independent die cushion force to the plurality of respective cushion pads, on the basis of a common die cushion force command or an individual die cushion force command, outputted from the die cushion force commanding device, and die cushion force detected by each of the plurality of die cushion force detectors.

According to yet another aspect of the present invention, it is possible to accurately apply uniform die cushion force corresponding to a common die cushion force command, or desired die cushion force corresponding to an individual die cushion force command, to a plurality of cushion pads, and particularly it is possible to accurately apply uniform die cushion force even in one cushion pad, or desired die cushion force for each position at which a die cushion force generator is arranged.

In a die cushion device of a press machine in accordance with yet another aspect of the present invention, it is preferable that the die cushion force commanding device is capable of setting a die cushion force command common to the plurality of die cushion force generators, a die cushion force command common to two or more of the die cushion force generators arranged in each of the cushion pads, or an individual die cushion force command for each of two or more of the die cushion force generators arranged in each of the cushion pads, and outputs the set die cushion force command.

According to yet another aspect of the present invention, it is possible to apply uniform die cushion force to a plurality of cushion pads, or to accurately apply desired die cushion force for each position at which a die cushion force generator is arranged, and particularly it is possible to appropriately apply die cushion force in accordance with a die cushion force command set by a die cushion force commanding device.

In a die cushion device of a press machine in accordance with yet another aspect of the present invention, the plurality of cushion pads has an individual die cushion stroke, and the die cushion controller includes a plurality of die cushion controllers that controls the plurality of respective cushion pads, and also the plurality of die cushion controllers controls the plurality of respective cushion pads.

According to yet another aspect of the present invention, it is possible to accurately apply independent die cushion force to each of a plurality of cushion pads, and particularly the die cushion device can be used for a plurality of die cushion devices depending on application and is available to various kinds of forming.

A die cushion device of a press machine in accordance with yet another aspect of the present invention includes a plurality of cushion pad position detectors that detects positions of the plurality of respective cushion pads. In the die cushion device, each of the plurality of die cushion controllers includes a die cushion position controller that includes a die cushion position commanding device that outputs an individual die cushion position command corresponding to each of the plurality of cushion pads, and a position control compensator that controls a corresponding die cushion force generator in the plurality of die cushion force generators to independently move up and down a corresponding cushion pad in the plurality of cushion pads, on the basis of a die cushion position command outputted from the die cushion position commanding device, and a position of a cushion pad, detected by a corresponding cushion pad position detector in the plurality of cushion pads position detector.

According to yet another aspect of the present invention, the die cushion device can serve as a plurality of die cushion devices for a plurality of respective cushion pads. As a result, a different die can be used for each of the die cushion devices, and thus a die cushion stroke of each of a plurality of cushion pads can be individually set.

In a die cushion device of a press machine in accordance with yet another aspect of the present invention, it is preferable that two or more of the die cushion force generators are arranged for each of the plurality of cushion pads, and that the plurality of cushion pad position detectors corresponding to the plurality of respective die cushion force generators is provided to detect each of positions of two or more of the die cushion force generators, arranged for each of the plurality of cushion pads, or detect a die cushion position near each of the positions. It is also preferable that the plurality of position control compensators corresponding to the plurality of respective die cushion force generators is provided to control the plurality of respective die cushion force generators to independently move up and down each of the plurality of cushion pads, on the basis of an individual die cushion position command corresponding to each of the plurality of cushion pads, outputted from the die cushion position commanding device, and a die cushion position detected by a corresponding cushion pad position detector in the plurality of cushion pad position detectors.

According to yet another aspect of the present invention, the die cushion device can serve as a plurality of die cushion devices for a plurality of respective cushion pads. As a result, a different die can be used for each of the die cushion devices, and thus a die cushion stroke of each of the plurality of cushion pads can be individually set. In particular, it is possible to control a position of each of the cushion pads so that each of the cushion pads does not incline.

A die cushion device of a press machine in accordance with yet another aspect of the present invention includes a plurality of die cushion force detectors that detects die cushion force applied to the plurality of respective cushion pads. In the die cushion device, each of the plurality of die cushion controllers includes a die cushion force controller that includes a die cushion force commanding device that outputs an individual die cushion force command corresponding to each of the plurality of cushion pads, and a die cushion force control compensator that controls each of the plurality of die cushion force generators to apply independent die cushion force to a corresponding cushion pad in the plurality of cushion pads, on the basis of a die cushion force command outputted from the die cushion force commanding device, and die cushion force detected by a corresponding die cushion force detector in the plurality of die cushion force detectors.

According to yet another aspect of the present invention, the die cushion device can serve as a plurality of die cushion devices for a plurality of respective cushion pads. As a result, a different die can be used for each of the die cushion devices, and thus a die cushion stroke and die cushion force of each of a plurality of cushion pads can be individually set. Accordingly, the die cushion device enables one press machine to perform drawing in multiple steps, such as from first drawing in a first die to the N-th drawing in the N-th die, or to perform deeper drawing, and thus is available for various kinds of forming.

In a die cushion device of a press machine in accordance with yet another aspect of the present invention, it is preferable that two or more of the die cushion force generators are arranged in each of the plurality of cushion pads, and that the plurality of die cushion force detectors corresponding to the plurality of respective die cushion force generators is provided to detect each die cushion force applied to the plurality of cushion pads from the plurality of respective die cushion force generators. It is also preferable that a die cushion force commanding device corresponding to each of the plurality of cushion pads, outputs an individual die cushion force command corresponding to each of two or more of the die cushion force generators, arranged in each of the cushion pads, and that the plurality of die cushion force control compensators controls the plurality of respective die cushion force generators to apply independent die cushion force to a corresponding cushion pad in the plurality of cushion pads, on the basis of a die cushion force command outputted from the die cushion force commanding device, and die cushion force detected by a corresponding die cushion force detector in the plurality of die cushion force detectors.

According to yet another aspect of the present invention, it is possible to accurately apply desired die cushion force corresponding to an individual die cushion force command for each of a plurality of cushion pads, and particularly it is possible to accurately apply desired die cushion force for each position at which a die cushion force generator is arranged even in one cushion pad.

In a die cushion device of a press machine in accordance with yet another aspect of the present invention, it is preferable that the die cushion force commanding device, corresponding to each of the plurality of cushion pads, is capable of setting a common die cushion force command corresponding to each of the cushion pads, or an individual die cushion force command for each of two or more of the die cushion force generators, arranged in each of the cushion pads, and outputs the set die cushion force command.

According to yet another aspect of the present invention, it is possible to apply uniform die cushion force corresponding to the common die cushion force command to the plurality of cushion pads, or to accurately apply desired die cushion force for each position at which the die cushion force generator is arranged, and particularly it is possible to appropriately apply die cushion force in accordance with a die cushion force command set by the die cushion force commanding device.

Since the present invention allows the die cushion device to independently control a plurality of cushion pads without having mechanical restriction, the die cushion device is capable of the following: improving a function of applying uniform die cushion force without depending on deformation or the like centering a bolster of a press machine; synchronization with higher accuracy than accuracy of mechanical synchronization between a plurality of cushion pads; and serving as a plurality of die cushion devices capable of setting a die cushion stroke and die cushion force for each of the plurality of cushion pads.

BRIEF DESCRIPTION OF THE DRAWINGS

FIG. 4 is a waveform chart illustrating change in each physical quantity when die cushion force is applied to the product in the shape illustrated in FIGS. 3A and 3B, Portion (A) of FIG. 4 being a waveform chart illustrating a slide position and die cushion position, and Portion (B) of FIG. 4 being a waveform chart illustrating a die cushion load applying to each of right and left cushion pads;

DETAILED DESCRIPTION OF THE EMBODIMENTS

With reference to accompanying drawings, preferable embodiments of a die cushion device of a press machine, in accordance with the present invention, will be described below in detail.

Configuration of Die Cushion Device of First Embodiment

Figure 1:
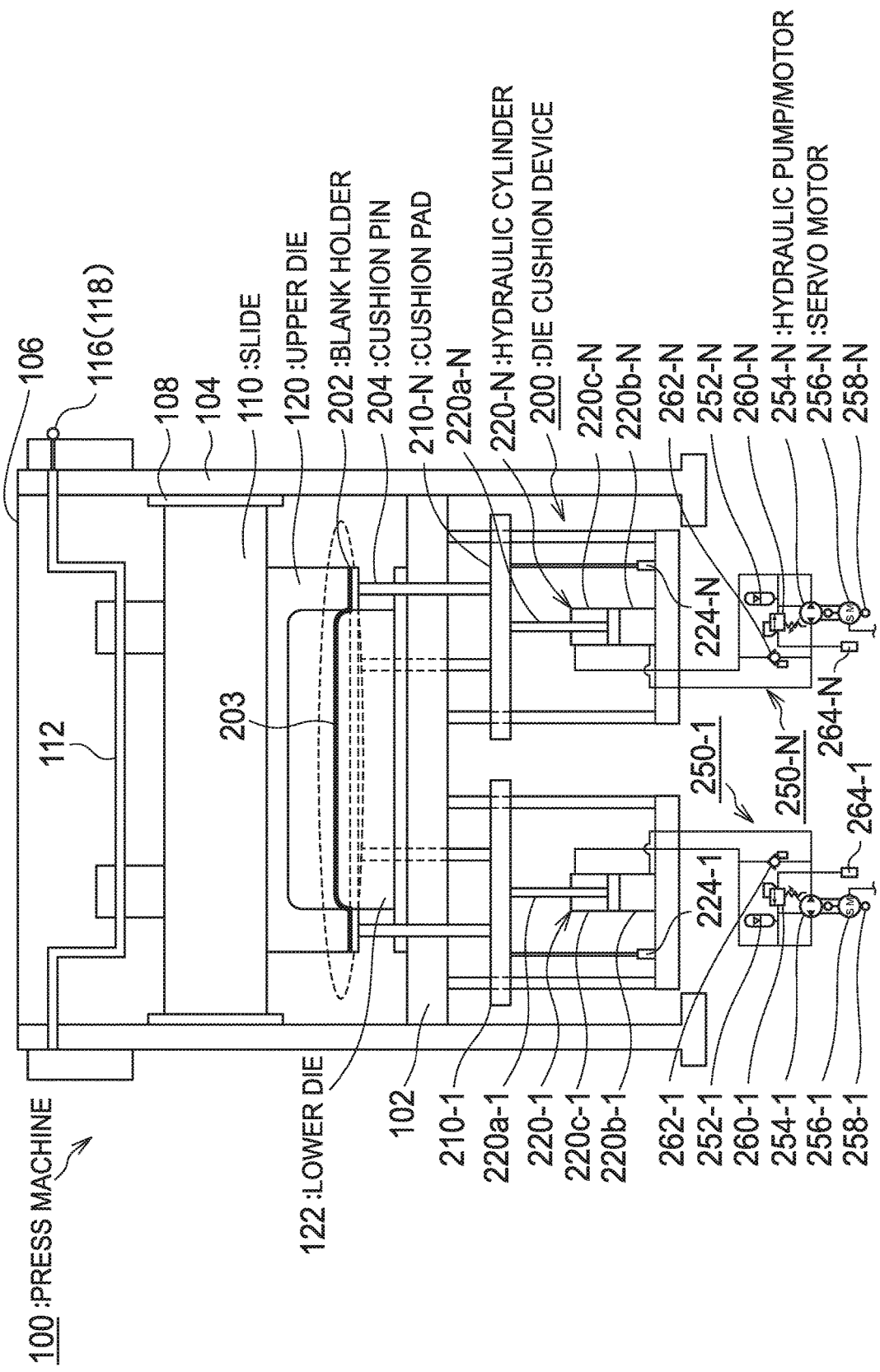
FIG. 1 is a structural view illustrating a first embodiment of a die cushion device of a press machine in accordance with the present invention.

FIG. 1 is a structural view illustrating a first embodiment of a die cushion device of a press machine in accordance with the present invention.

A press machine 100 illustrated in FIG. 1 includes a frame that includes a bolster (bed) 102, a column 104, and a crown 106, and a slide 110 that is movably guided in a vertical direction by a guide section 108 provided in the column 104. The slide 110 is moved in a vertical direction in FIG. 1 by a crank mechanism including a crankshaft 112 to which rotational driving force is transmitted by a driving device (not illustrated).

The crankshaft 112 includes a crank angle detector 116 that detects an angle of the crankshaft 112, and a crank angular velocity detector 118.

An upper die 120 is mounted on the slide 110, and a lower die 122 is mounted on the bed 102 (on a bolster thereof).

A die cushion device 200 includes: a blank holder (blank holding plate) 202; a plurality of cushion pads 210-1 to 210-N (N is an integer of 2 or more) that supports the blank holder 202 through a plurality of cushion pins 204; a plurality of hydraulic cylinders 220-1 to 220-N that supports the cushion pads 210-1 to 210-N, respectively; a plurality of hydraulic circuits 250-1 to 250-N that drives the hydraulic cylinders 220-1 to 220-N, respectively; and a die cushion controller 300 (refer to FIG. 2) that controls the hydraulic circuits 250-1 to 250-N.

The hydraulic cylinders 220-1 to 220-N and the hydraulic circuits 250-1 to 250-N serve as a plurality of die cushion force generators that can independently move up and down the cushion pads 210-1 to 210-N, respectively, and that can apply independent die cushion force to the cushion pads 210-1 to 210-N, respectively.

In addition, a plurality of cushion pad position detectors 224-1 to 224-N corresponding to the plurality of hydraulic cylinders 220-1 to 220-N, respectively, is provided to respectively detect positions of respective piston rods 220a-1 to 220a-N of the respective hydraulic cylinders 220-1 to 220-N in an extending direction, as positions of the respective cushion pads 210-1 to 210-N in a lifting direction (cushion pad position).

A blank holder 202 is arranged between the upper die 120 and the lower die 122. A lower side of the blank holder is supported by the cushion pads 210-1 to 210-N through the plurality of cushion pins 204, and a material 203 is set on (brought into contact with) an upper side of the blank holder. The blank holder 202 may be divided so as to correspond to the plurality of the cushion pads 210-1 to 210-N.

Next, a configuration of each of the hydraulic circuits 250-1 to 250-N that drive the hydraulic cylinders 220-1 to 220-N, respectively, will be described.

The hydraulic circuits 250-1 to 250-N respectively includes accumulators 252-1 to 252-N, hydraulic pump/motors 254-1 to 254-N, servo motors 256-1 to 256-N that are connected to the corresponding rotating shafts of the respective hydraulic pump/motor 254-1 to 254-N, servo motor angular velocity detectors 258-1 to 258-N that detect angular velocity (servo motor angular velocity ω) of the corresponding drive shafts of the respective servo motors 256-1 to 256-N, relief valves 260-1 to 260-N, check valves 262-1 to 262-N, and die cushion pressure detectors 264-1 to 264-N, each of which is equivalent to the die cushion force detector.

Since each of the hydraulic circuits 250-1 to 250-N has the same configuration, the hydraulic circuit 250-1 will be described below.

The accumulator 252-1, in which low gas pressure is applied, not only serves as a tank, but also serves to supply oil under substantially constant low pressure to a rising-side pressurizing chamber (pressurizing chamber in which cushion pressure occurs) 220b-1 of the hydraulic cylinder 220-1 through the check valve 262-1 to allow pressure in the chamber to easily rise when die cushion force is controlled.

One port (discharge port) of the hydraulic pump/motor 254-1 is connected to the rising-side pressurizing chamber 220b-1 of the hydraulic cylinder 220-1, and the other port is connected to the accumulator 252-1.

The relief valve 260-1 is provided as a device that operates to prevent a hydraulic machine from breaking when abnormal pressure occurs, or when abnormal pressure suddenly occurs due to inoperative die cushion force control. In addition, a descending-side pressurizing chamber (pad-side pressurizing chamber) 220c-1 of the hydraulic cylinder 220-1 is connected to the accumulator 252-1.

The die cushion pressure detector 264-1 detects pressure acting in the rising-side pressurizing chamber 220b-1 of the hydraulic cylinder 220-1, and the servo motor angular velocity detector 258-1 detects angular velocity of the servo motor 256-1.

(Principle of Die Cushion Force Control)

Since die cushion force can be expressed by the product of pressure in the rising-side pressurizing chamber 220b-1 of the hydraulic cylinder 220-1, and area of a cylinder, controlling die cushion force means controlling pressure in the rising-side pressurizing chamber 220b-1 of the hydraulic cylinder 220-1.

A static behavior in die cushion force control can be expressed by expressions (1) and (2) below:

$$P = \int K((v \cdot A - k1 Q \cdot \omega)/V) dt \qquad (1)$$

$$T = k2 \cdot PQ/(2\pi) \qquad (2), \text{where}$$

A is cross-sectional area of a hydraulic cylinder on a die cushion pressure occurrence side;

V is volume of the hydraulic cylinder on the die cushion pressure occurrence side;

P is die cushion pressure;

T is torque of an electric (servo) motor;

I is moment of inertia of the servo motor;

DM is a viscous resistance coefficient of the servo motor;

fM is friction torque of the servo motor;

Q is pushed-out volume of a hydraulic motor;

$F_{slide}$ is force applied to a piston rod of the hydraulic cylinder from a slide;

v is velocity of a pad when the pad is pressed by a press;

M is inertial mass of the piston rod of the hydraulic cylinder, and the pad;

DS is a viscous resistance coefficient of the hydraulic cylinder;

fS is frictional force of the hydraulic cylinder;

ω is angular velocity of the servo motor that is rotated by pressure of oil;

K is a volume elastic coefficient of hydraulic oil; and k1 and k2 are constants of proportionality.

In addition, a dynamic behavior in the die cushion force control can be expressed by expressions (3) and (4) below, along with the expressions (1) and (2).

$$PA - F = M \cdot dv/dt + DS \cdot v + fS \qquad (3)$$

$$T - k2 \cdot PQ/(2\pi) = I \cdot d\omega/dt + DM \cdot \omega + fM \qquad (4)$$

The expressions (1) to (4) described above means the following: Force transmitted to the hydraulic cylinder 220-1 from the slide 110 through the cushion pad 210-1 pressurizes oil in the rising-side pressurizing chamber 220b-1 of the hydraulic cylinder 220-1 to create die cushion pressure; Simultaneously, the die cushion pressure allows the hydraulic pump/motor 254-1 to serve as a hydraulic motor to rotate the servo motor 256-1 when rotating shaft torque occurring in the hydraulic pump/motor 254-1 becomes equal to driving torque of the servo motor 256-1, thereby preventing the die cushion pressure from rising; Thus, the die cushion pressure (die cushion force) is determined in accordance with the driving torque of the servo motor 256-1.

First Embodiment of Die Cushion Controller

Figure 2:
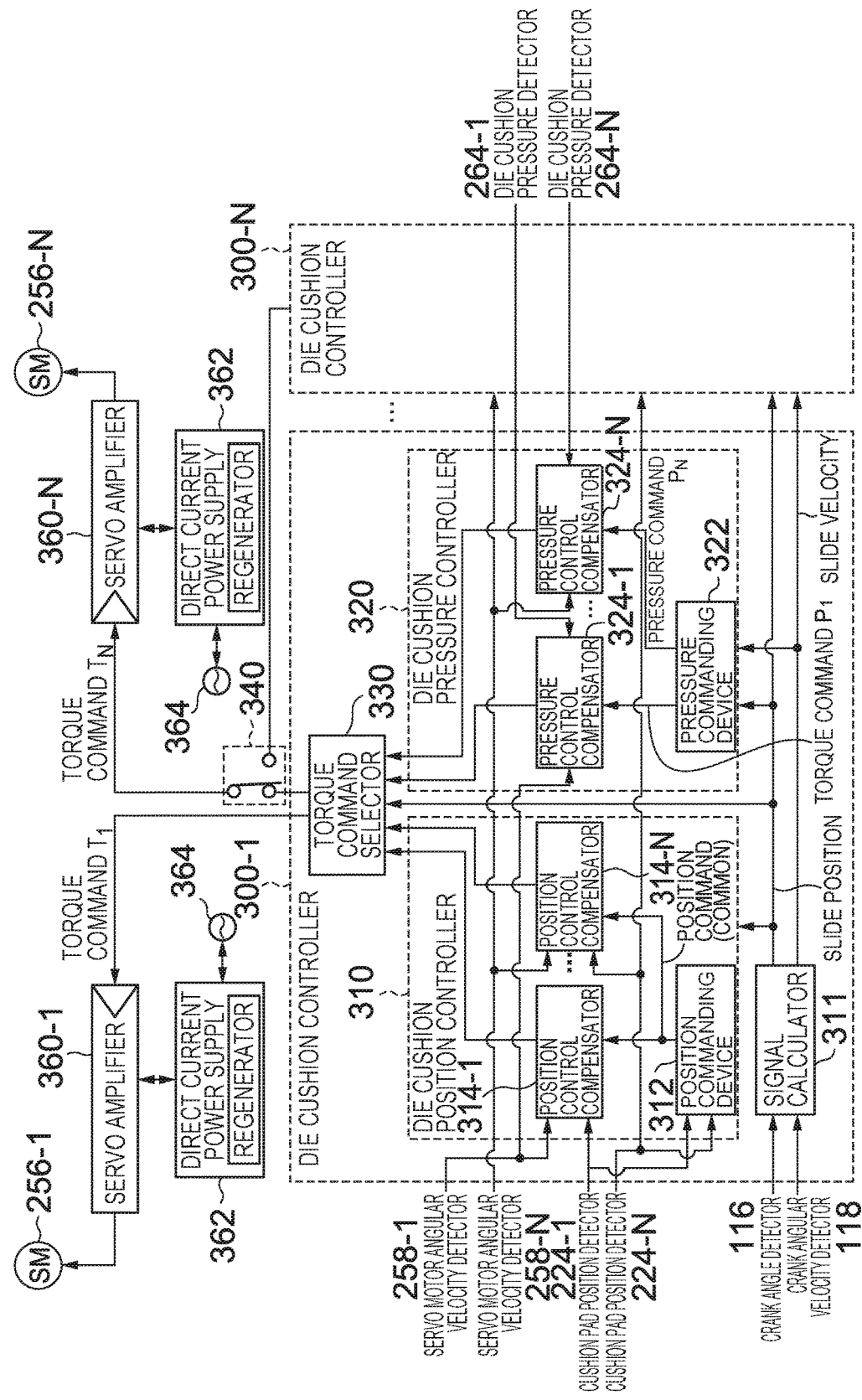
FIG. 2 is a block diagram illustrating a first embodiment of a die cushion controller in the die cushion device illustrated in FIG. 1.

FIG. 2 is a block diagram illustrating a first embodiment of the die cushion controller 300 in the die cushion device 200 illustrated in FIG. 1.

The die cushion controller 300 includes the number of die cushion controllers 300-1 to 300-N, corresponding to the number of the cushion pads 210-1 to 210-N. In particular, the die cushion controller 300 of the first embodiment is shown in the case where a torque command N selector 340 selects the die cushion controller 300-1 to control the plurality of cushion pads 210-1 to 210-N as one (multi-axis (N-axis) synchronization type) servo die cushion device.

Since each of the plurality of die cushion controllers 300-1 to 300-N has the same function, the die cushion controller 300-1 that controls the cushion pad 210-1 will be described.

The die cushion controller 300-1 includes a die cushion position controller 310, a signal calculator 311, a die cushion pressure controller 320, and a torque command selector 330.

The signal calculator 311 receives a crank angle signal and a crank angular velocity signal from the crank angle detector 116 and the crank angular velocity detector 118, respectively. The signal calculator 311 calculates a slide position signal showing a slide position from the crank angle signal, and outputs the calculated slide position signal to the die cushion position controller 310, the die cushion pressure controller 320, and the torque command selector 330. The signal calculator 311 also calculates a slide velocity signal showing slide velocity from the crank angular velocity signal, and outputs the calculated slide velocity signal to the die cushion pressure controller 320.

The torque command selector 330 determines whether the slide 110 is in an area of a non-working process or in an area of a working process on the basis of a received slide position signal. When the slide 110 is in the area of a non-working process, a die cushion position control state by the die cushion position controller 310 is selected. When the slide 110 is in the area of a working process, a die cushion force control state by the die cushion pressure controller 320 is selected.

(Control of Die Cushion Position)

The die cushion position controller 310 includes a position commanding device 312, and a plurality of position control compensators 314-1 to 314-N, which are equivalent to the die cushion position commanding device. The position commanding device 312 receives a cushion pad position detection signal showing a cushion pad position from the cushion pad position detectors 224-1 to 224-N to use the signal to create an initial value in creation of a position command. The position commanding device 312 outputs a common position command (die cushion position command) to control a cushion pad position (a position of each of the cushion pads 210-1 to 210-N) so that a product is allowed to be knocked out after the slide 110 reaches a bottom dead center to finish the die cushion force control, and each of the cushion pads 210-1 to 210-N stays at a cushion pad standby position that is an initial position.

In the case of the die cushion position control, the position control compensators 314-1 to 314-N create a plurality of torque commands $T_1$ to $T_N$ on the basis of the common position command outputted from the position commanding device 312, and cushion pad position detection signals created by the respective cushion pad position detectors 224-1 to 224-N, and output the created torque commands $T_1$ to $T_N$ to the torque command selector 330. The torque command selector 330, in the case of the die cushion position control state, selects the torque commands $T_1$ to $T_N$ created by the respective position control compensators 314-1 to 314-N, and outputs the torque commands $T_1$ to $T_N$ to the servo motors 256-1 to 256-N through servo amplifiers 360-1 to 360-N, respectively.

Accordingly, driving of the servo motors 256-1 to 256-N is controlled, and the hydraulic pump/motors 254-1 to 254-N (refer to FIG. 1) provided with respective drive shafts connected to the corresponding servo motors 256-1 to 256-N are rotated by driving torque received from the servo motors 256-1 to 256-N, respectively, to supply pressure oil respectively to the rising-side pressurizing chambers 220b-1 to 220b-N of the respective hydraulic cylinders 220-1 to 220-N. The hydraulic cylinders 220-1 to 220-N with the respective rising-side pressurizing chambers 220b-1 to 220b-N to which the pressure oil is supplied raise the cushion pads 210-1 to 210-N, respectively, through the respective piston rods 220a-1 to 220a-N. As a result, a position (die cushion position) of each of the cushion pads 210-1 to 210-N can be controlled. It is preferable that the position control compensators 314-1 to 314-N respectively receive servo motor angular velocity signals of the respective servo motors 256-1 to 256-N, created by the servo motor angular velocity detectors 258-1 to 258-N, respectively, and perform position control of the cushion pads 210-1 to 210-N in the lifting direction on the basis of the servo motor angular velocity signals to secure dynamic stability in the position control.

As described above, while the die cushion position controller 310 independently controls a die cushion position of each of the plurality of cushion pads 210-1 to 210-N, a position of each of the cushion pads is accurately controlled on the basis of a common position command Thus, the cushion pads have a common die cushion stroke, and positons of the cushion pads is controlled while the cushion pads are regarded as virtually one cushion pad.

(Control of Die Cushion Pressure or Die Cushion Force)

The die cushion pressure controller 320 equivalent to the die cushion force controller includes a pressure commanding device 322 equivalent to the die cushion force commanding device, and pressure control compensators 324-1 to 324-N equivalent to the plurality of die cushion force control compensators.

The pressure commanding device 322 receives a slide position signal calculated by the signal calculator 311 to output pressure commands $P_1$ to $P_N$ in accordance with a position of the slide 110. The pressure commanding device 322, for example, outputs stepwise pressure commands $P_1$ to $P_N$, and controls output timing or the like of the pressure commands $P_1$ to $P_N$ on the basis of the slide position signal.

The pressure commands $P_1$ to $P_N$ to be outputted form the pressure commanding device 322 may be common to the plurality of hydraulic cylinders 220-1 to 220-N (the plurality of cushion pads 210-1 to 210-N), or may individually correspond to the plurality of hydraulic cylinders 220-1 to 220-N. That is, the pressure commanding device 322 is capable of setting a common pressure command, or an individual pressure command for each of the hydraulic cylinders 220-1 to 220-N, and outputs the set pressure commands $P_1$ to $P_N$. Further, the pressure commands $P_1$ to $P_N$ are not limited to stepwise pressure commands, and may change stepwise, or change like a taper, in accordance with a die cushion position.

The pressure control compensators 324-1 to 324-N receive pressure detection signals showing pressure in the corresponding rising-side pressurizing chambers 220b-1 to 220b-N of the respective hydraulic cylinders 220-1 to 220-N, created by the die cushion pressure detectors 264-1 to 264-N, respectively, to control die cushion pressure as indicated by the pressure commands $P_1$ to $P_N$ received from the pressure commanding device 322. It is preferable that the pressure control compensators 324-1 to 324-N receive the corresponding servo motor angular velocity signals of the respective servo motors 256-1 to 256-N, created by the servo motor angular velocity detectors 258-1 to 258-N, respectively, and control die cushion pressure on the basis of the servo motor angular velocity signals to secure dynamic stability in the die cushion pressure control.

The pressure control compensators 324-1 to 324-N output the torque commands $T_1$ to $T_N$, respectively, calculated by using the pressure commands $P_1$ to $P_N$, the pressure detection signals, the servo motor angular velocity signals, and the slide velocity signal, to the torque command selector 330, when control is switched from a die cushion position control state or a die cushion standby position (holding) control state to a die cushion pressure control state. The torque command selector 330, in the case of the die cushion pressure control, selects the torque commands $T_1$ to $T_N$ created by the pressure control compensators 324-1 to 324-N, respectively, and outputs the torque commands $T_1$ to $T_N$ to the servo motors 256-1 to 256-N through the servo amplifiers 360-1 to 360-N, respectively.

Accordingly, the pressure control compensators 324-1 to 324-N control driving torque of the servo motors 256-1 to 256-N, respectively, to control pressure applied to the rising-side pressurizing chambers 220b-1 to 220b-N of the respective hydraulic cylinders 220-1 to 220-N from the hydraulic pump/motors 254-1 to 254-N (refer to FIG. 1) provided with respective drive shafts connected to the servo motors 256-1 to 256-N, respectively, thereby controlling die cushion force occurring from each of the hydraulic cylinders 220-1 to 220-N.

In the case of the die cushion pressure control, while the slide 110 descends to reach the bottom dead center after colliding with the material 203 (and blank holder 202) or during working, a direction of torque output of the servo motors 256-1 to 256-N is opposite to a direction of generated velocity. That is, power received by each of the cushion pads 210-1 to 210-N from the slide 110 allows pressure oil to flow into the hydraulic pump/motors 254-1 to 254-N from the rising-side pressurizing chambers 220b-1 to 220b-N of the respective hydraulic cylinders 220-1 to 220-N, and thus the hydraulic pump/motors 254-1 to 254-N serve as hydraulic motors. The servo motors 256-1 to 256-N are driven by the hydraulic pump/motors 254-1 to 254-N, respectively, to serve as generators. Electric power generated by the servo motors 256-1 to 256-N is regenerated in an alternating current power source 364 through the direct current power supply device 362 with a function of regenerating electric power to supply electric power to the servo amplifiers 360-1 to 360-N.

Die cushion force of each of the plurality of the cushion pads 210-1 to 210-N is independently controlled by the die cushion pressure controller 320 without having mechanical restriction. Accordingly, if the pressure commanding device 322 outputs the common pressure commands $P_1$ to $P_N$, uniform die cushion force can be applied to the plurality of the cushion pads 210-1 to 210-N. In addition, if the pressure commanding device 322 outputs individual pressure commands $P_1$ to $P_N$, desired die cushion force corresponding to the pressure commands $P_1$ to $P_N$ can be accurately applied for each of the cushion pads 210-1 to 210-N.

Figure 3A:
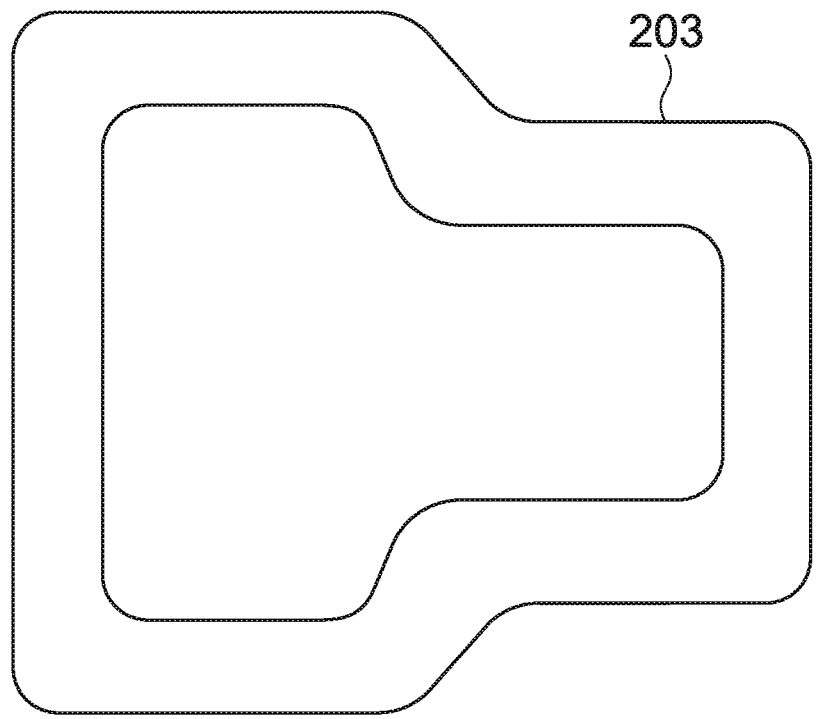
FIGS. 3A and 3B are respectively a plan view and side view of a material (product) to be press-molded.
Figure 3B:

FIGS. 3A and 3B are enlarged views of the material 203 (product) in the middle of forming, encircled by a broken line illustrated in FIG. 1. FIGS. 3A and 3B are a plan view and side view of the product, respectively.

As illustrated in FIG. 3A, when the material 203 is formed by using all dies (the upper die 120 and the lower die 122) of one product in the drawing shape in which a left side shape is larger than a right side shape, a press load deviated in a side-to-side direction of the material 203 is applied. In this case, it is preferable that die cushion force different is applied for each of the cushion pads 210-1 to 210-N (such as divided right and left for each of the cushion pads) rather than uniform die cushion force is applied to the plurality of cushion pads 210-1 to 210-N.

FIG. 4 is a waveform chart illustrating change in each physical quantity when die cushion force is applied to the product in the shape illustrated in FIGS. 3A and 3B. Portion (A) of FIG. 4 is a waveform chart illustrating a slide position and die cushion position, and Portion (B) of FIG. 4 is a waveform chart illustrating a die cushion load applying to each of right and left cushion pads.

In the case of press forming of the product in the drawing shape in which the left side shape is larger than the right side shape as illustrated in FIG. 3A, as illustrated in Portion (B) of FIG. 4, die cushion force is controlled for each of right and left cushion pads so that die cushion load to be applied to the left cushion pad is more than die cushion load to be applied to the right cushion pad. In this way, die cushion force to be applied to each of divided cushion pads is independently controlled without having mechanical restriction, and thus it is possible to apply die cushion force to each of the cushion pads as intended (accurately as indicated by a command). As a result, formability can be greatly improved.

Configuration of Die Cushion Device of Second Embodiment

Figure 5:
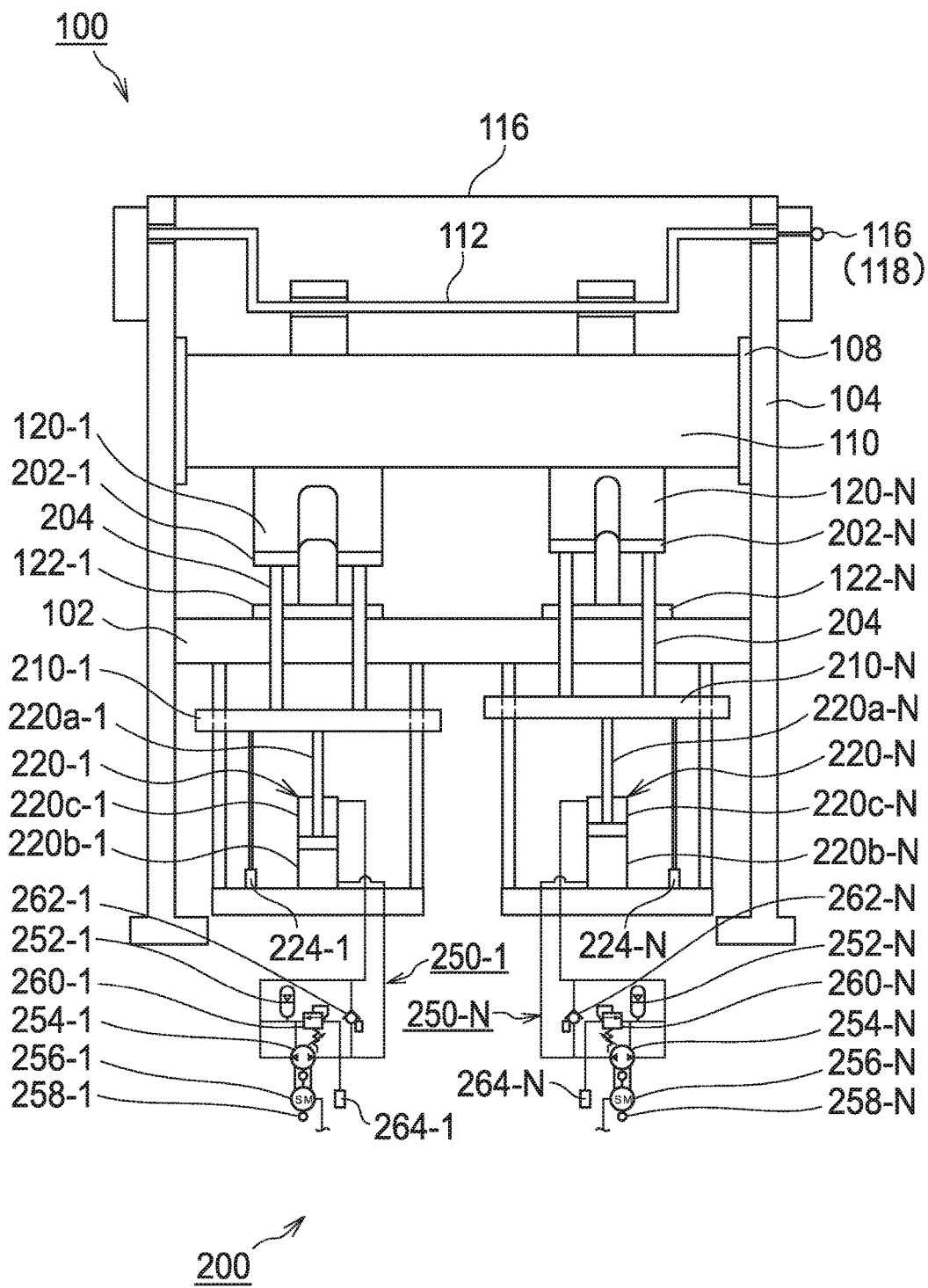
FIG. 5 is a structural view illustrating a second embodiment of the die cushion device of a press machine in accordance with the present invention.

FIG. 5 is a structural view illustrating a second embodiment of the die cushion device of a press machine in accordance with the present invention. A portion common to that of the first embodiment of the die cushion device of a press machine, illustrated in FIG. 1, is designated by the same reference numeral as that of FIG. 1 without duplicated description in detail.

Even if the die cushion device of a press machine of the first embodiment independently provides die cushion position control and die cushion force control to each of the plurality of cushion pads 210-1 to 210-N, the die cushion device serves as one die cushion device with a plurality of cushion pads. Contrarily, the die cushion device of a press machine of the second embodiment not only serves as one die cushion device, but also is available as the number of die cushion devices, corresponding to the number of cushion pads, depending on application. Thus, the second embodiment is different from the first embodiment in that the second embodiment is available for various kinds of forming.

In the second embodiment illustrated in FIG. 5, a plurality of independent upper dies 120-1 to 120-N and lower dies 122-1 to 122-N, corresponding to the plurality of cushion pads 210-1 to 210-N, respectively, is attached to each of the slide 110 and the bed 102.

In addition, a plurality of blank holders 202-1 to 202-N is independently supported by the plurality of cushion pads 210-1 to 210-N, respectively, through the corresponding cushion pins 204.

As illustrated in FIG. 5, the upper die 120-1 and lower die 122-1 are different from the upper die 120-N and lower die 122-N in die shape, and each of the plurality of cushion pads 210-1 to 210-N has an individual (different) die cushion stroke.

Second Embodiment of Die Cushion Controller

Figure 6:
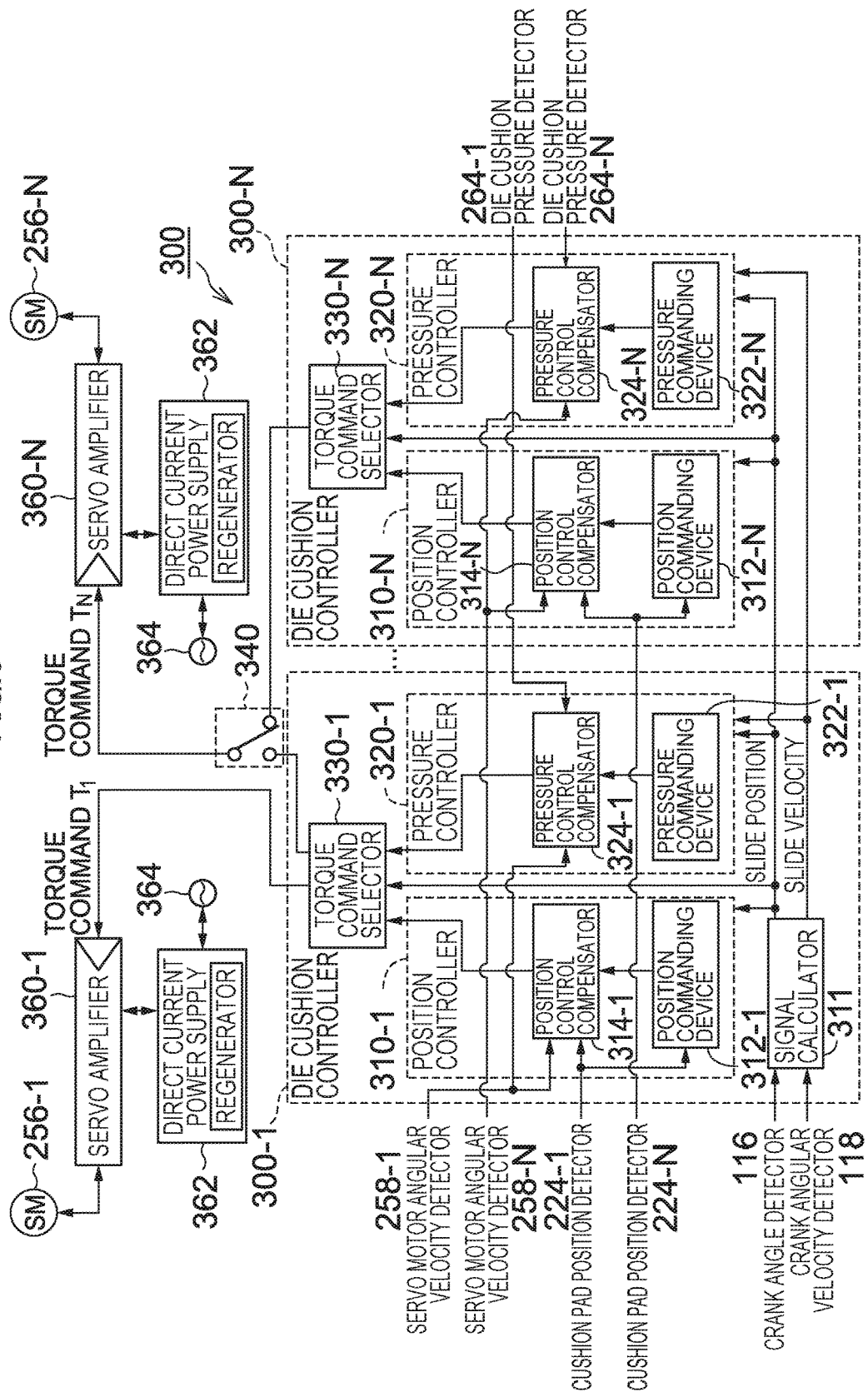
FIG. 6 is a block diagram illustrating a second embodiment of a die cushion controller in the die cushion device illustrated in FIG. 5.

FIG. 6 is a block diagram illustrating a second embodiment of the die cushion controller 300 in the die cushion device 200 illustrated in FIG. 5.

In FIG. 6, the die cushion controller 300 includes the number of die cushion controllers 300-1 to 300-N, corresponding to the number of the cushion pads 210-1 to 210-N. In particular, the die cushion controller 300 of the second embodiment is shown in the case where the torque command N selector 340 selects the die cushion controllers 300-1 to 300-N to control the plurality of cushion pads 210-1 to 210-N as N separate servo die cushion devices.

A user can select a function of serving as only one servo die cushion device of the first embodiment illustrated in FIG. 2, or a function of serving as N servo die cushion devices of the second embodiment illustrated in FIG. 6, at any time, by switching the torque command N selector 340. Since each of the plurality of die cushion controllers 300-1 to 300-N has the same function, the die cushion controller 300-1 that controls the cushion pad 210-1 will be described.

The die cushion controller 300-1 includes a die cushion position controller 310-1, a die cushion pressure controller 320-1, and a torque command selector 330-1.

The die cushion position controller 310-1 includes a position commanding device 312-1 equivalent to the die cushion position commanding device, and a position control compensator 314-1. The position commanding device 312-1 receives a cushion pad position detection signal showing a cushion pad position from the cushion pad position detector 224-1 to use the signal to create an initial value in creation of a position command. The position commanding device 312-1 not only allows a product to be knocked out after the slide 110 reaches a bottom dead center to finish the die cushion force control, but also outputs a position command (die cushion position command) to control a cushion pad position (a position of the cushion pad 210-1) so that the cushion pad 210-1 stays at a cushion pad standby position that is an initial position.

In the case of the die cushion position control state, the position control compensator 314-1 creates the torque command $T_1$ on the basis of the position command outputted from the position commanding device 312-1, and the cushion pad position detection signal created by the cushion pad position detector 224-1, and outputs the created torque command $T_1$ to the torque command selector 330-1. The torque command selector 330-1, in the case of the die cushion position control, selects the torque command $T_1$ created by the position control compensator 314-1, and outputs the torque command $T_1$ to the servo motor 256-1 through the servo amplifier 360-1.

Accordingly, driving of the servo motor 256-1 is controlled, and the hydraulic pump/motor 254-1 (refer to FIG. 5) provided with a drive shaft connected to the servo motor 256-1 is rotated by driving torque received from the servo motor 256-1, to supply pressure oil to the rising-side pressurizing chamber 220b-1 of the hydraulic cylinders 220-1. The hydraulic cylinder 220-1 with the rising-side pressurizing chamber 220b-1 to which the pressure oil is supplied raises the cushion pad 210-1 through the piston rods 220a-1. As a result, a position (die cushion position) of the cushion pad 210-1 can be controlled. It is preferable that the position control compensator 314-1 receives a servo motor angular velocity signal of the servo motor 256-1, created by the servo motor angular velocity detector 258-1, and performs position control of the cushion pad 210-1 in the lifting direction on the basis of the servo motor angular velocity signal to secure dynamic stability in the position control.

As described above, the die cushion position controller 310-1 can independently and accurately control a position of the cushion pad 210-1 in the plurality of cushion pads 210-1 to 210-N. Likewise, the die cushion position controller 310-N can independently and accurately control a position of the cushion pad 210-N in the plurality of cushion pads 210-1 to 210-N.

The die cushion pressure controller 320-1 equivalent to the die cushion force controller includes a pressure commanding device 322-1 equivalent to the die cushion force commanding device, and the pressure control compensator 324-1 equivalent to the die cushion force control compensators.

The pressure commanding device 322-1 receives a slide position signal calculated by the signal calculator 311 to output a pressure command in accordance with a position of the slide 110. The pressure commanding device 322-1, for example, outputs a stepwise pressure command, and controls output timing or the like of the pressure command on the basis of the slide position signal.

The pressure control compensator 324-1 receives a pressure detection signal showing pressure in the rising-side pressurizing chamber 220b-1 of the hydraulic cylinders 220-1, created by the die cushion pressure detectors 264-1, to control die cushion pressure as indicated by the pressure command received from the pressure commanding device 322-1. It is preferable that the pressure control compensator 324-1 receives the servo motor angular velocity signal of the servo motor 256-1, created by the servo motor angular velocity detector 258-1, and controls die cushion pressure on the basis of the servo motor angular velocity signal to secure dynamic stability in the die cushion pressure control.

The pressure control compensator 324-1 outputs the torque command $T_1$ calculated by using the pressure command, the pressure detection signal, the servo motor angular velocity signal, and the slide velocity signal, to the torque command selector 330-1, when control is switched from a die cushion position control state or a die cushion standby position (holding) control state to a die cushion pressure control state. The torque command selector 330-1, in the case of the die cushion pressure control, selects the torque command $T_1$ created by the pressure control compensator 324-1, and outputs the torque command $T_1$ to the servo motor 256-1 through the servo amplifier 360-1.

Accordingly, the pressure control compensator 324-1 controls driving torque of the servo motor 256-1 to control pressure applied to the rising-side pressurizing chamber 220b-1 of the hydraulic cylinder 220-1 from the hydraulic pump/motor 254-1 (refer to FIG. 5) provided with a drive shaft connected to the servo motor 256-1, thereby controlling die cushion pressure occurring from the hydraulic cylinder 220-1.

As described above, the die cushion position controller 310-1 can independently and accurately control die cushion force applied to the cushion pad 210-1 in the plurality of cushion pads 210-1 to 210-N. Likewise, the die cushion position controller 310-N can independently and accurately control die cushion force applied to the cushion pad 210-N in the plurality of cushion pads 210-1 to 210-N.

Thus, in the case of press forming of a product, in which height varies, by using dies each of which has a different die cushion stroke as illustrated in FIG. 5, the die cushion device of the second embodiment can serve as a separate die cushion device for each of the cushion pads.

At this time, the die cushion controller 300 can use a method of configuring the number of die cushion controllers corresponding to the number of cushion pads in software by using the same hardware, or a method of configuring the number of die cushion controllers corresponding to the number of cushion pads by using separate hardware.

Configuration of Die Cushion Device of Third Embodiment

Figure 7:
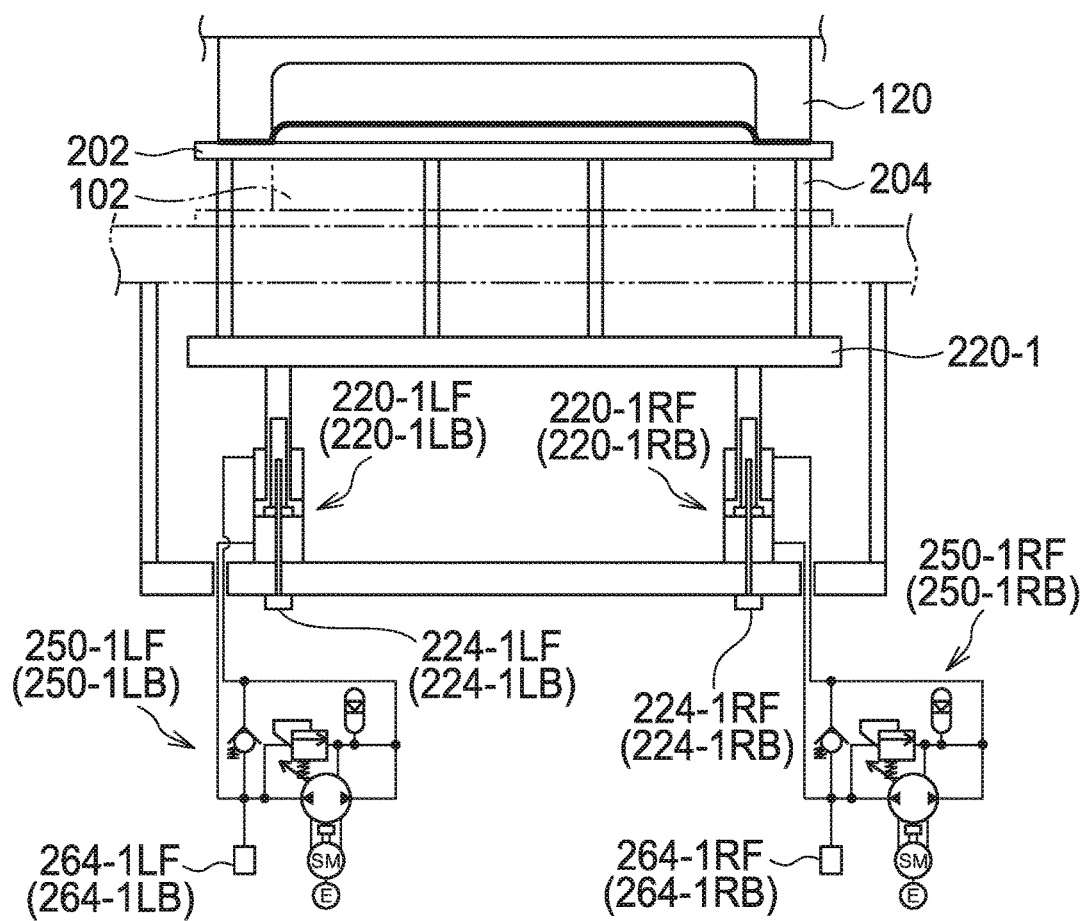
FIG. 7 is a structural view illustrating a main section of a third embodiment of the die cushion device of a press machine in accordance with the present invention.

FIG. 7 is a structural view illustrating a main section of a third embodiment of the die cushion device of a press machine in accordance with the present invention. A portion common to that of the first and second embodiments of the die cushion device of a press machine, illustrated in FIGS. 1 and 5, respectively, is designated by the same reference numeral as that of FIGS. 1 and 5 without duplicated description in detail.

The die cushion device of a press machine of each of the first and second embodiments has the number of cushion pads 210-1 to 210-N that is the same as the number of hydraulic cylinders 220-1 to 220-N that drives the cushion pads 210-1 to 210-N, as well as that is the same as the number of hydraulic circuits 250-1 to 250-N. Contrarily, the die cushion device of a press machine of the third embodiment illustrated in FIG. 7 is different in that a plurality of hydraulic cylinders 220-1LF (220-1LB) and 220-1RF (220-1RB), and a plurality of hydraulic circuits 250-1LF (250-1LB) and 250-1RF (250-1RB), are provided for one cushion pad (the cushion pad 210-1 in an example illustrated in FIG. 7) in the plurality of cushion pads 210-1 to 210-N.

As illustrated in FIG. 7, the one cushion pad 210-1 in the plurality of cushion pads 210-1 to 210-N is supported by four hydraulic cylinders 220-1LF (220-1LB) and 220-1RF (220-1RB) so as to be able to move up and down. Although the four hydraulic cylinders 220-1LF (220-1LB) and 220-1RF (220-1RB) are arranged at the left-front, left-back, right-front, and right-back, of the cushion pad 210-1, respectively, FIG. 7 illustrates only the left-front hydraulic cylinder 220-1LF and the right-front hydraulic cylinder 220-1RF.

The plurality of hydraulic circuits 250-1LF (250-1LB) and 250-1RF (250-1RB) drives the hydraulic cylinders 220-1LF (220-1LB) and 220-1RF (220-1RB), respectively, and has the same configuration as that of the hydraulic circuit 250-1 illustrated in FIG. 5. FIG. 7 illustrates only the hydraulic cylinders 220-1LF and 220-1RF that drive the left-front hydraulic cylinder 220-1LF and the right-front hydraulic cylinder 220-1RF, respectively.

The four hydraulic cylinders 220-1LF (220-1LB) and 220-1RF (220-1RB) internally include cushion pad position detectors 224-1LF (224-1LB) and 224-1RF (224-1RB), respectively. Each of the cushion pad position detectors 224-1LF (224-1LB) and 224-1RF (224-1RB) includes a magnetism scale that is fixed to the die cushion frame 210 (on a cylinder side), and a magnetism detection head that reads out the magnetism scale and that is fixed to a piston rod.

Accordingly, the cushion pad position detectors 224-1LF (224-1LB) and 224-1RF (224-1RB) can detect positions of respective piston rods of the four hydraulic cylinders 220-1LF (220-1LB) and 220-1RF (220-1RB), respectively, or can detect respective height positions (cushion pad position) of four places in the cushion pad 210-1, at each of which a tip of the piston rod is attached. Although the cushion pad position detectors 224-1LF (224-1LB) and 224-1RF (224-1RB) are provided at attachment positions (inside the cylinder) of the hydraulic cylinders 220-1LF (220-1LB) and 220-1RF (220-1RB), respectively, the cushion pad position detectors may be provided near the corresponding hydraulic cylinders.

The hydraulic circuits 250-1LF (250-1LB) and 250-1RF (250-1RB) respectively include die cushion pressure detectors 264-1LF (264-1LB) and 264-1RF (264-1RB), which detect pressure acting in respective rising-side pressurizing chambers of the hydraulic cylinders 220-1LF (220-1LB) and 220-1RF (220-1RB), respectively.

Figure 8:
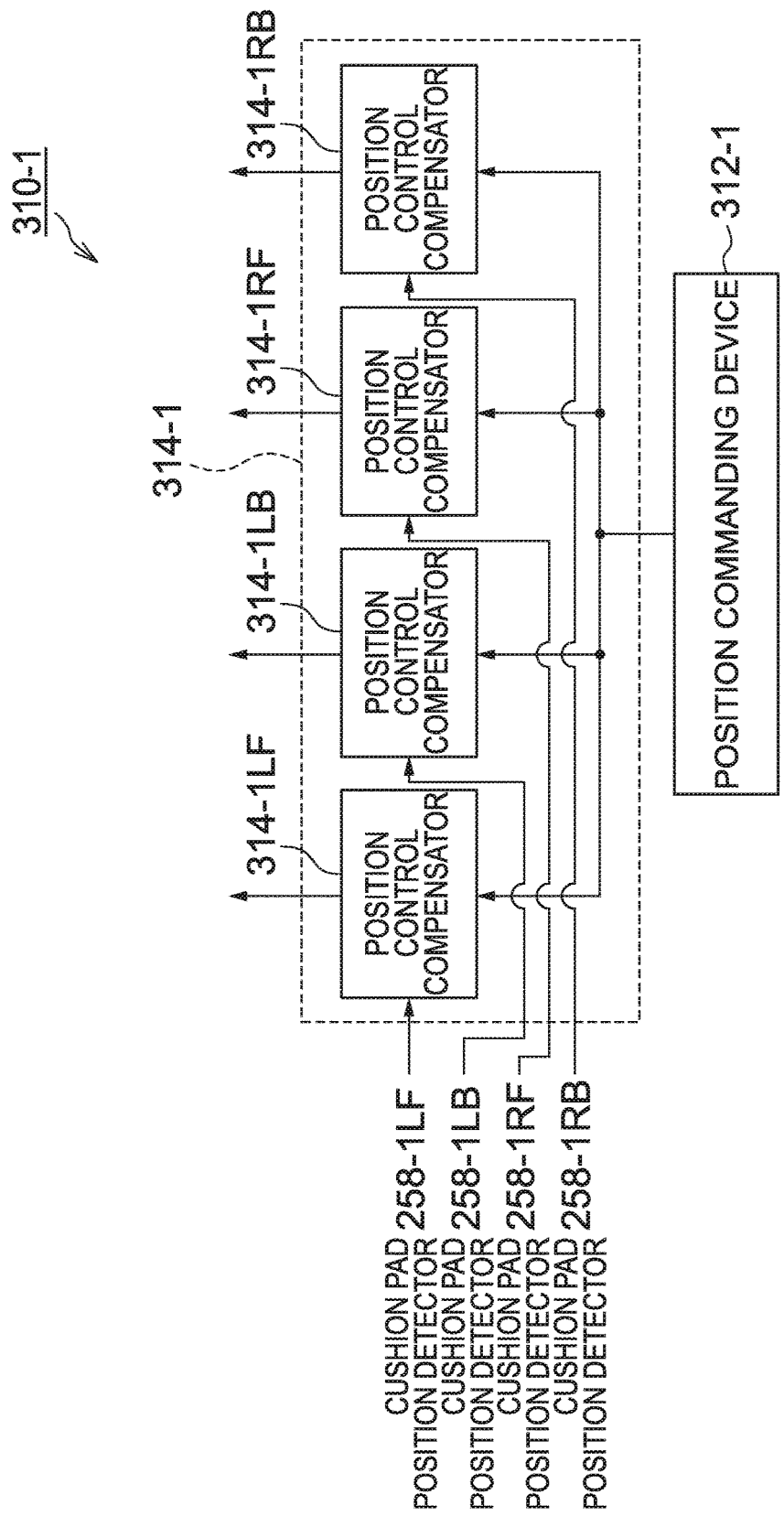
FIG. 8 is a block diagram illustrating a main section of a third embodiment of a die cushion controller in the die cushion device illustrated in FIG. 7, and particularly is a block diagram illustrating a die cushion position controller.
Figure 9:
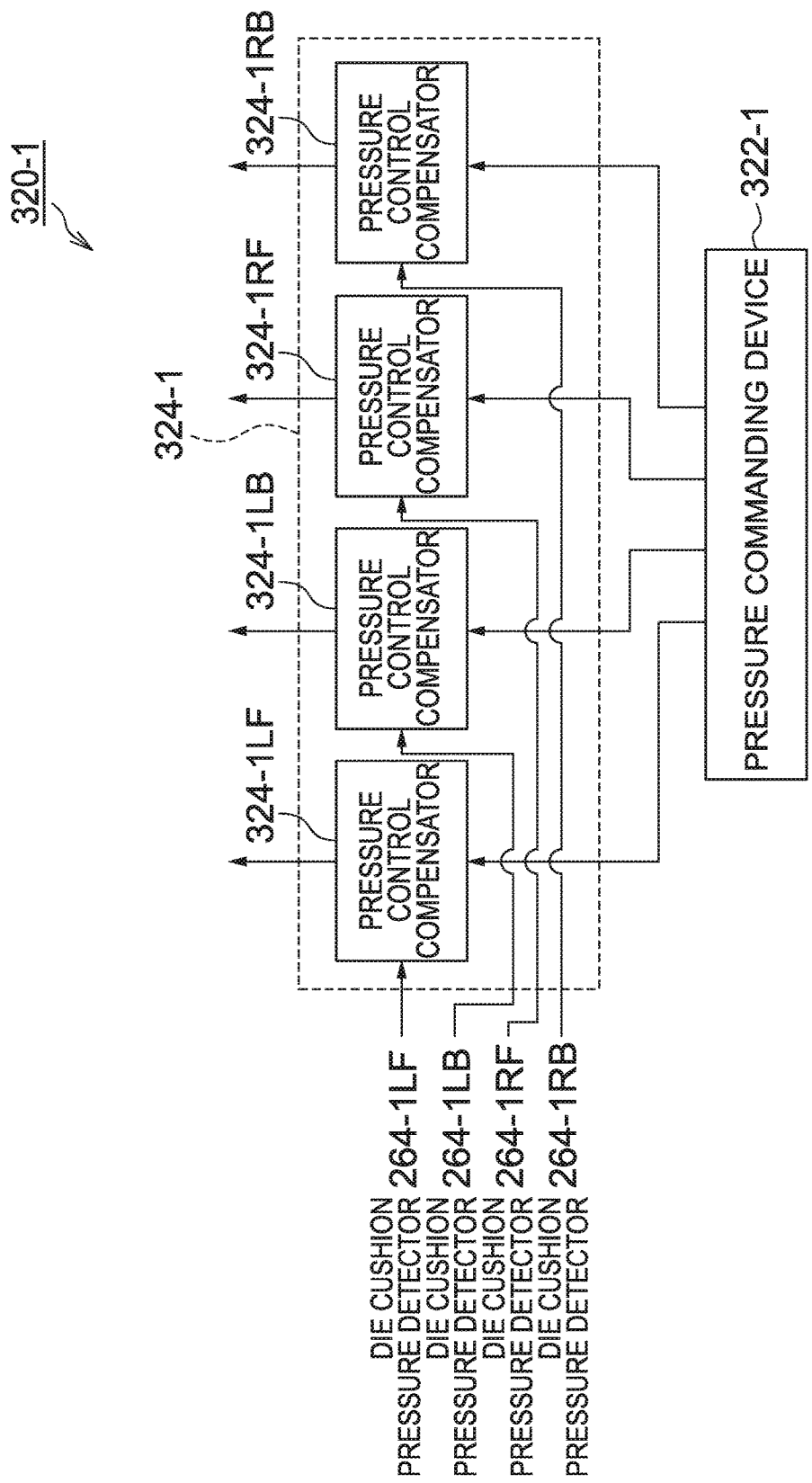
FIG. 9 is a block diagram illustrating a main section of the third embodiment of the die cushion controller in the die cushion device illustrated in FIG. 7, and particularly is a block diagram illustrating a die cushion pressure controller.

Each of FIGS. 8 and 9 is a block diagram illustrating a main section of the third embodiment of the die cushion controller in the die cushion device illustrated in FIG. 7. FIG. 8 illustrates the die cushion position controller, and FIG. 9 illustrates the die cushion pressure controller.

As illustrated in FIG. 8, the die cushion position controller 310-1 includes a position commanding device 312-1 equivalent to the die cushion position commanding device, and the position control compensator 314-1 including four position control compensators 314-1LF, 314-1LB, 314-1RF, and 314-1RB.

The position commanding device 312-1 outputs a common position command to each of the position control compensators 314-1LF, 314-1LB, 314-1RF, and 314-1RB.

The four position control compensators 314-1LF, 314-1LB, 314-1RF, and 314-1RB receive cushion pad position detection signals showing respective four positions in the cushion pad 210-1 (positions in the cushion pad 210-1, at which piston rods of the respective hydraulic cylinders 220-1LF, 220-1LB, 220-1RF, and 220-1RB are attached) from the cushion pad position detectors 224-1LF, 224-1LB, 224-1RF, and 224-1RB, respectively, along with the common position command. The position control compensators 314-1LF, 314-1LB, 314-1RF, and 314-1RB create torque commands to drive respective servo motors 256-1 in the four hydraulic circuits 250-1LF, 250-1LB, 250-1RF, and 250-1RB, on the basis of a position command outputted from the position commanding device 312-1, and cushion pad position detection signals created by the respective cushion pad position detectors 224-1LF, 224-1LB, 224-1RF, and 224-1RB.

Controlling torque of each of the servo motors 256-1 on the basis of the corresponding torque commands created by the respective position control compensators 314-1LF, 314-1LB, 314-1RF, and 314-1RB, controls a position of the cushion pad 210-1. It is preferable that the position control compensators 314-1LF, 314-1LB, 314-1RF, and 314-1RB receive the corresponding servo motor angular velocity signals of the respective servo motors 256-1, and perform position control of the cushion pad 210-1 in the lifting direction on the basis of the corresponding servo motor angular velocity signals to secure dynamic stability in the position control.

Accordingly, the die cushion position controller 310-1 can accurately control a position of the cushion pad 210-1 as indicated by the position command while parallelism of the cushion pad 210-1 is held. Likewise, the die cushion position controller 310-N (not illustrated) can accurately control a position of the cushion pad 210-N as indicated by the position command while parallelism of the cushion pad 210-N in the plurality of cushion pads 210-1 to 210-N is held.

As illustrated in FIG. 9, the die cushion pressure controller 320-1 includes the pressure commanding device 322-1 equivalent to the die cushion force commanding device, and the pressure control compensator 324-1 including four pressure control compensators 324-1LF, 324-1LB, 324-1RF, and 324-1RB.

The pressure commanding device 322-1 outputs a common pressure command or an individual pressure command to each of the four hydraulic cylinders 220-1LF (220-1LB) and 220-1RF (220-1RB). The pressure command to be outputted from the pressure commanding device 322-1 may be common to the plurality of hydraulic cylinders 220-1LF (220-1LB) and 220-1RF (220-1RB), or may individually correspond to the plurality of hydraulic cylinders 220-1LF (220-1LB) and 220-1RF (220-1RB). That is, the pressure commanding device 322-1 is capable of setting a common pressure command, or an individual pressure command for each of the hydraulic cylinders 220-1LF (220-1LB) and 220-1RF (220-1RB), and outputs the set pressure command.

The four pressure control compensators 324-1LF, 324-1LB, 324-1RF, and 324-1RB receive the corresponding pressure detection signals showing pressure acting in the rising-side pressurizing chambers of the respective hydraulic cylinders 220-1LF (220-1LB) and 220-1RF (220-1RB), created by the die cushion pressure detectors 264-1LF, 264-1LB, 264-1RF, and 264-1RB, respectively, to control die cushion pressure as indicated by the pressure command received from the pressure commanding device 322-1.

The pressure control compensators 324-1LF, 324-1LB, 324-1RF, and 324-1RB, calculate the corresponding torque commands to drive the servo motors 256-1 in the respective hydraulic circuits 250-1LF, 250-1LB, 250-1RF, and 250-1RB on the basis of the pressure command received from the pressure commanding device 322-1, and the pressure detection signals received from the die cushion pressure detectors 264-1LF, 264-1LB, 264-1RF, and 264-1RB, respectively.

Controlling torque of each of the servo motors 256-1 on the basis of the corresponding torque commands calculated by the respective pressure control compensators 324-1LF, 324-1LB, 324-1RF, and 324-1RB, controls die cushion force acting in each of the hydraulic cylinders 220-1LF (220-1LB) and 220-1RF (220-1RB). It is preferable that the pressure control compensators 324-1LF, 324-1LB, 324-1RF, and 324-1RB receive the corresponding servo motor angular velocity signals of the respective servo motors 256-1, and control die cushion pressure on the basis of the corresponding servo motor angular velocity signals to secure dynamic stability in the die cushion pressure control.

Accordingly, the die cushion pressure controller 320-1 can individually and accurately control die cushion force acing in the cushion pad 210-1 for each of the hydraulic cylinders 220-1LF (220-1LB) and 220-1RF (220-1RB), supporting the cushion pad 210-1. Likewise, the die cushion pressure controller 320-N (not illustrated) can accurately control die cushion force acting in the cushion pad 210-N in the plurality of cushion pads 210-1 to 210-N for each of two or more of the hydraulic cylinders supporting the cushion pad 210-N.

(Others)

Although the die cushion force generator of each of the embodiments includes a hydraulic cylinder that moves up and down a cushion pad, and a hydraulic circuit (hydraulic motor and servo motor) that drives the hydraulic cylinder, besides this, any configuration that generates die cushion force is available, such as: a configuration using a mechanism that includes a screw nut mechanism configured to move up and down a cushion pad, and a servo motor that drives the screw nut mechanism; and a configuration using a mechanism that includes a rack-and-pinion mechanism configured to move up and down a cushion pad, and a servo motor that drives the rack-and-pinion mechanism, and therefore the present invention is available for any servo die cushion device.

The present invention is not limited to the embodiments described above, and therefore, it is needless to say that a variety of modifications are possible within a range without departing from the spirit of the present invention.

EXPLANATION OF REFERENCES

100: press machine
110: slide
116: crank angle detector
118: crank angular velocity detector
120, 120-1 to 120-N: upper die
122, 122-1 to 122-N: lower die
200: die cushion device
202, 202-1 to 202-N: blank holder
203: material
204: cushion pin
210, 210-1 to 210-N: cushion pad
220-1 to 220-N, 220-1LF, 220-1LB, 220-1RF, 220-1RB: hydraulic cylinder
224-1 to 224-N, 224-1LF, 224-1LB, 224-1RF, 224-1RB: cushion pad position detector
250-1 to 250-N, 250-1LF, 250-1LB, 250-1RF, 250-1RB: hydraulic circuit
254-1 to 254-N hydraulic pump/motor
256-1 to 256-N: servo motor
258-1 to 258-N: servo motor angular velocity detector
264-1 to 264-N, 264-1LF, 264-1LB, 264-1RF, 264-1RB: die cushion pressure detector
300, 300-1 to 300N: die cushion controller
310, 310-1 to 310N: die cushion position controller
312, 312-1 to 312N: position commanding device
314-1 to 314-N: position control compensator
320, 320-1 to 320N: die cushion pressure controller
322, 322-1 to 322N: pressure commanding device
324-1 to 324-N: pressure control compensator

What is claimed is:

1. A die cushion device of a press machine comprising:
a plurality of cushion pads;
a plurality of die cushion force generators that supports the plurality of respective cushion pads, and that is capable of independently moving up and down the plurality of respective cushion pads as well as independently generating die cushion force for each of the cushion pads; and
a die cushion controller that controls the plurality of die cushion force generators to independently move up and down the plurality of respective cushion pads as well as to independently generate die cushion force for each of the cushion pads,
wherein the plurality of cushion pads has a common die cushion stroke,
wherein the die cushion controller includes only one die cushion controller to control the plurality of respective cushion pads as one cushion pad,
wherein the die cushion device further comprises a plurality of cushion pad position detectors that detects cushion pad positions of the plurality of respective cushion pads,
wherein the die cushion controller includes a die cushion position controller that includes a die cushion position commanding device that outputs a common die cushion position command, and a plurality of position control compensators that controls the plurality of respective die cushion force generators to independently move up and down each of the plurality of cushion pads, on the basis of the common die cushion position command outputted from the die cushion position commanding device, and cushion pad positions detected by the plurality of respective cushion pad position detectors, wherein two or more of the die cushion force generators are arranged for each of the plurality of cushion pads, wherein the plurality of cushion pad position detectors corresponding to the plurality of respective die cushion force generators is provided to detect each of positions of two or more of the die cushion force generators, arranged for each of the plurality of cushion pads, or detect a die cushion position near each of the positions, and wherein the plurality of position control compensators corresponding to the plurality of respective die cushion force generators is provided to control the plurality of respective die cushion force generators to independently move up and down each of the plurality of cushion pads, on the basis of the common die cushion position command outputted from the die cushion position commanding device, and a die cushion position detected by a corresponding cushion pad position detector in the plurality of cushion pad position detectors.

2. A die cushion device of a press machine comprising:
a plurality of cushion pads;
a plurality of die cushion force generators that supports the plurality of respective cushion pads, and that is capable of independently moving up and down the plurality of respective cushion pads as well as independently generating die cushion force for each of the cushion pads; and
a die cushion controller that controls the plurality of die cushion force generators to independently move up and down the plurality of respective cushion pads as well as to independently generate die cushion force for each of the cushion pads,
wherein the plurality of cushion pads has a common die cushion stroke,
wherein the die cushion controller includes only one die cushion controller to control the plurality of respective cushion pads as one cushion pad,
wherein the die cushion device further comprises a plurality of die cushion force detectors that detects corresponding die cushion force applied to the plurality of cushion pads from the plurality of respective die cushion force generators,
wherein the die cushion controller includes a die cushion force controller that includes a die cushion force commanding device that outputs a common die cushion force command or an individual die cushion force command corresponding to each of the plurality of cushion pads, to the plurality of die cushion force generators, and a die cushion force control compensator that controls each of the plurality of die cushion force generators to apply independent die cushion force to each of the plurality of cushion pads, on the basis of the common die cushion force command or the individual die cushion force command, outputted from the die cushion force commanding device, and die cushion force detected by each of the plurality of die cushion force detectors, wherein two or more of the die cushion force generators are arranged in each of the plurality of cushion pads, wherein the plurality of die cushion force detectors corresponding to the plurality of respective die cushion force generators is provided to detect each die cushion force applied to the plurality of cushion pads from the plurality of respective die cushion force generators, and wherein the plurality of die cushion force control compensators controls the plurality of respective die cushion force generators to apply independent die cushion force to the plurality of respective cushion pads, on the basis of a common die cushion force command or an individual die cushion force command, outputted from the die cushion force commanding device, and die cushion force detected by each of the plurality of die cushion force detectors.

3. The die cushion device of a press machine according to claim 2,
wherein the die cushion force commanding device is capable of setting a die cushion force command common to the plurality of die cushion force generators, a die cushion force command common to two or more of the die cushion force generators arranged in each of the cushion pads, or an individual die cushion force command for each of two or more of the die cushion force generators arranged in each of the cushion pads, and outputs the set die cushion force command.

4. A die cushion device of a press machine comprising:
a plurality of cushion pads;
a plurality of die cushion force generators that supports the plurality of respective cushion pads, and that is capable of independently moving up and down the plurality of respective cushion pads as well as independently generating die cushion force for each of the cushion pads; and
a die cushion controller that controls the plurality of die cushion force generators to independently move up and down the plurality of respective cushion pads as well as to independently generate die cushion force for each of the cushion pads,
wherein the plurality of cushion pads has an individual die cushion stroke,
wherein the die cushion controller includes a plurality of die cushion controllers that controls the plurality of respective cushion pads, and the plurality of die cushion controllers controls the plurality of respective cushion pads,
wherein the die cushion device further comprises a plurality of cushion pad position detectors that detects positions of the plurality of respective cushion pads,
wherein each of the plurality of die cushion controllers includes a die cushion position controller that includes a die cushion position commanding device that outputs an individual die cushion position command corresponding to each of the plurality of cushion pads, and a position control compensator that controls a corresponding die cushion force generator in the plurality of die cushion force generators to independently move up and down a corresponding cushion pad in the plurality of cushion pads, on the basis of a die cushion position command outputted from the die cushion position commanding device, and a position of a cushion pad, detected by a corresponding cushion pad position detector in the plurality of cushion pads position detector, wherein two or more of the die cushion force generators are arranged for each of the plurality of cushion pads, wherein the plurality of cushion pad position detectors corresponding to the plurality of respective die cushion force generators is provided to detect each of positions of two or more of the die cushion force generators, arranged for each of the plurality of cushion pads, or a die cushion position near each of the positions, and wherein the plurality of position control compensators corresponding to the plurality of respective die cushion force generators is provided to control each of the plurality of die cushion force generators to independently move up and down each of the plurality of cushion pads, on the basis of an individual die cushion position command corresponding to each of the plurality of cushion pads, outputted from the die cushion position commanding device, and a die cushion position detected by a corresponding cushion pad position detector in the plurality of cushion pad position detectors.

5. A die cushion device of a press machine comprising:

a plurality of cushion pads;

a plurality of die cushion force generators that supports the plurality of respective cushion pads, and that is capable of independently moving up and down the plurality of respective cushion pads as well as independently generating die cushion force for each of the cushion pads; and a die cushion controller that controls the plurality of die cushion force generators to independently move up and down the plurality of respective cushion pads as well as to independently generate die cushion force for each of the cushion pads, wherein the plurality of cushion pads has an individual die cushion stroke, wherein the die cushion controller includes a plurality of die cushion controllers that controls the plurality of respective cushion pads, and the plurality of die cushion controllers controls the plurality of respective cushion pads, wherein the die cushion device further comprises a plurality of die cushion force detectors that detects die cushion force applied to the plurality of respective cushion pads, wherein each of the plurality of die cushion controllers includes a die cushion force controller that includes a die cushion force commanding device that outputs an individual die cushion force command corresponding to each of the plurality of cushion pads, and a die cushion force control compensator that controls each of the plurality of die cushion force generators to apply independent die cushion force to a corresponding cushion pad in the plurality of cushion pads, on the basis of a die cushion force command outputted from the die cushion force commanding device, and die cushion force detected by a corresponding die cushion force detector in the plurality of die cushion force detectors, wherein two or more of the die cushion force generators are arranged in each of the plurality of cushion pads, wherein the plurality of die cushion force detectors corresponding to the plurality of respective die cushion force generators is provided to detect each die cushion force applied to the plurality of cushion pads from the plurality of respective die cushion force generators, wherein a die cushion force commanding device corresponding to each of the plurality of cushion pads, outputs an individual die cushion force command corresponding to each of two or more of the die cushion force generators, arranged in each of the cushion pads, and wherein the plurality of die cushion force control compensators controls the plurality of respective die cushion force generators to apply independent die cushion force to a corresponding cushion pad in the plurality of cushion pads, on the basis of a die cushion force command outputted from the die cushion force commanding device, and die cushion force detected by a corresponding die cushion force detector in the plurality of die cushion force detectors.

6. The die cushion device of a press machine according to claim 5, wherein the die cushion force commanding device, corresponding to each of the plurality of cushion pads, is capable of setting a common die cushion force command corresponding to each of the cushion pads, or an individual die cushion force command for each of two or more of the die cushion force generators, arranged in each of the cushion pads, and outputs the set die cushion force command.

* * * * *